(12) United States Patent
Chang et al.

(10) Patent No.: US 12,477,206 B2
(45) Date of Patent: *Nov. 18, 2025

(54) CAMERA MODULE AND ELECTRONIC DEVICE

(71) Applicant: LARGAN DIGITAL CO., LTD., Taichung (TW)

(72) Inventors: Lin An Chang, Taichung (TW); Te-Sheng Tseng, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,167

(22) Filed: May 28, 2024

(65) Prior Publication Data

US 2024/0323511 A1 Sep. 26, 2024

Related U.S. Application Data

(63) Continuation of application No. 17/878,862, filed on Aug. 1, 2022, now Pat. No. 12,035,030.

(60) Provisional application No. 63/330,692, filed on Apr. 13, 2022.

(51) Int. Cl.
*H04N 23/57* (2023.01)
*G02B 5/00* (2006.01)
(Continued)

(52) U.S. Cl.
CPC ............. *H04N 23/57* (2023.01); *G02B 5/003* (2013.01); *G02B 7/04* (2013.01); *H02K 41/0354* (2013.01)

(58) Field of Classification Search
CPC .......... G02B 5/003; G02B 7/04; G02B 7/021; G02B 7/1828; G02B 2205/0069;
(Continued)

(56) References Cited

U.S. PATENT DOCUMENTS 9,784,988 B2  10/2017  Kim et al.
9,910,291 B2  3/2018  Kim et al.
(Continued)

FOREIGN PATENT DOCUMENTS

CN  210136348 U  3/2020
CN  108693620 B  10/2021
(Continued)

OTHER PUBLICATIONS

BR Office Action dated Sep. 4, 2025 in application No. 102023006131-1.

*Primary Examiner* — Marly S Camargo
(74) *Attorney, Agent, or Firm* — Maschoff Brennan

(57) ABSTRACT

A camera module includes a fixed base, a carrier, an elastic element, an imaging lens, a coil, a magnetic element, a connection wire and a light-blocking coating. The carrier is disposed opposite to the fixed base and has a bobbin. The elastic element is connected to the fixed base and the carrier so as to provide freedom of movement of the carrier with respect to the fixed base. The imaging lens is disposed on the carrier and has an optical axis. The coil is disposed on the carrier. The magnetic element is disposed corresponding to the coil so as to provide a driving force for moving the carrier. The connection wire is disposed on the bobbin and electrically connected to the elastic element and the coil, and the connection wire has at least part facing towards the optical axis where the light-blocking coating is disposed.

17 Claims, 14 Drawing Sheets

(51) Int. Cl.
  *G02B 7/02* (2021.01)
  *G02B 7/04* (2021.01)
  *G02B 7/18* (2021.01)
  *G03B 3/10* (2021.01)
  *G03B 17/02* (2021.01)
  *G03B 30/00* (2021.01)
  *H02K 41/035* (2006.01)

(58) Field of Classification Search
  CPC ...... H02K 41/0354; G03B 3/10; G03B 30/00; G03B 2205/0069; G03B 2217/002; G03B 17/02; H04N 23/57
  See application file for complete search history.

(56) References Cited

U.S. PATENT DOCUMENTS

| | | | |
|---|---|---|---|
| 10,955,641 B2 | 3/2021 | Hu et al. | |
| 10,983,303 B2 | 4/2021 | Jung et al. | |
| 11,226,542 B2 | 1/2022 | Wu et al. | |
| 12,035,030 B2 * | 7/2024 | Chang | H04N 23/57 |
| 2009/0316040 A1 * | 12/2009 | Takatsuka | G02B 7/08 |
| | | | 348/376 |
| 2011/0051264 A1 | 3/2011 | Kim | |
| 2011/0217029 A1 | 9/2011 | Wu et al. | |
| 2016/0033786 A1 * | 2/2016 | Kim | G02B 27/646 |
| | | | 359/557 |
| 2019/0212520 A1 * | 7/2019 | Lin | G02B 7/021 |
| 2020/0409171 A1 | 12/2020 | Xu et al. | |
| 2021/0302690 A1 | 9/2021 | Lin et al. | |
| 2022/0116523 A1 | 4/2022 | Park | |
| 2022/0221734 A1 | 7/2022 | Kim et al. | |
| 2024/0019711 A1 * | 1/2024 | Tseng | G02B 27/646 |
| 2024/0231056 A1 * | 7/2024 | Hsu | H04N 23/58 |

FOREIGN PATENT DOCUMENTS

| | | |
|---|---|---|
| CN | 214335335 U | 10/2021 |
| CN | 114008764 A | 2/2022 |
| CN | 108957679 B | 3/2022 |

* cited by examiner

CAMERA MODULE AND ELECTRONIC DEVICE

RELATED APPLICATIONS

This application is a continuation patent application of U.S. application Ser. No. 17/878,862 filed on Aug. 1, 2022, which claims priority to U.S. Provisional Application No. 63/330,692, filed on Apr. 13, 2022, which is incorporated by reference herein in its entirety.

BACKGROUND

Technical Field

The present disclosure relates to a camera module and an electronic device, more particularly to a camera module applicable to an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, conventional optical systems are difficult to meet the requirement of high optical quality of an electronic device under diversified development in recent years, especially image quality which would be easily affected due to non-imaging light (e.g., stray light) reflected in a lens. The conventional configuration inside a lens is prone to reflect light, and therefore it is difficult to meet progressive market requirements in optical quality nowadays. Therefore, how to improve the configuration inside a lens to prevent generating reflected light for meeting the requirement of high-end-specification electronic devices is an important topic in this field nowadays.

SUMMARY

According to one aspect of the present disclosure, a camera module includes a fixed base, a carrier, an elastic element, an imaging lens, a coil, a magnetic element, a connection wire and a light-blocking coating. The carrier is disposed opposite to the fixed base, and the carrier has a bobbin. The elastic element is connected to the fixed base and the carrier so as to provide freedom of movement of the carrier along a direction with respect to the fixed base. The imaging lens is disposed on the carrier and has an optical axis. The coil is disposed on the carrier. The magnetic element is disposed corresponding to the coil so as to provide a driving force for moving the carrier along the direction. The connection wire is disposed on the bobbin, the connection wire is electrically connected to the elastic element and the coil, and the connection wire has at least part facing towards the optical axis. The light-blocking coating is disposed on the at least part of the connection wire facing towards the optical axis.

According to another aspect of the present disclosure, a camera module includes a fixed base, a carrier, an elastic element, an imaging lens, a coil, a magnetic element, a connection wire and a light-blocking coating. The carrier is disposed opposite to the fixed base, and the carrier has a bobbin. The elastic element is connected to the fixed base and the carrier so as to provide freedom of movement of the carrier along a direction with respect to the fixed base. The imaging lens is disposed on the carrier and having an optical axis. The coil is disposed on the carrier. The magnetic element is disposed corresponding to the coil so as to provide a driving force for moving the carrier along the direction. The connection wire is disposed on the bobbin, the connection wire is electrically connected to the elastic element and the coil, and the connection wire has at least part fixedly disposed on the elastic element. The light-blocking coating is disposed on a position where the at least part of the connection wire and the elastic element are fixed.

According to another aspect of the present disclosure, a camera module includes a fixed base, a carrier, an elastic element, an imaging lens, a coil, a magnetic element, a connection wire and an optical glue material. The carrier is disposed opposite to the fixed base, and the carrier has a bobbin. The elastic element is connected to the fixed base and the carrier so as to provide freedom of movement of the carrier along a direction with respect to the fixed base. The imaging lens is disposed on the carrier and having an optical axis. The coil is disposed on the carrier. The magnetic element is disposed corresponding to the coil so as to provide a driving force for moving the carrier along the direction. The connection wire is disposed on the bobbin, and the connection wire is electrically connected to the elastic element and the coil. The optical glue material is disposed on at least part of the connection wire, and the optical glue material is configured to prevent light reflected off the connection wire on the bobbin from being incident on an image surface of the imaging lens.

According to another aspect of the present disclosure, an electronic device includes one of the aforementioned camera modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
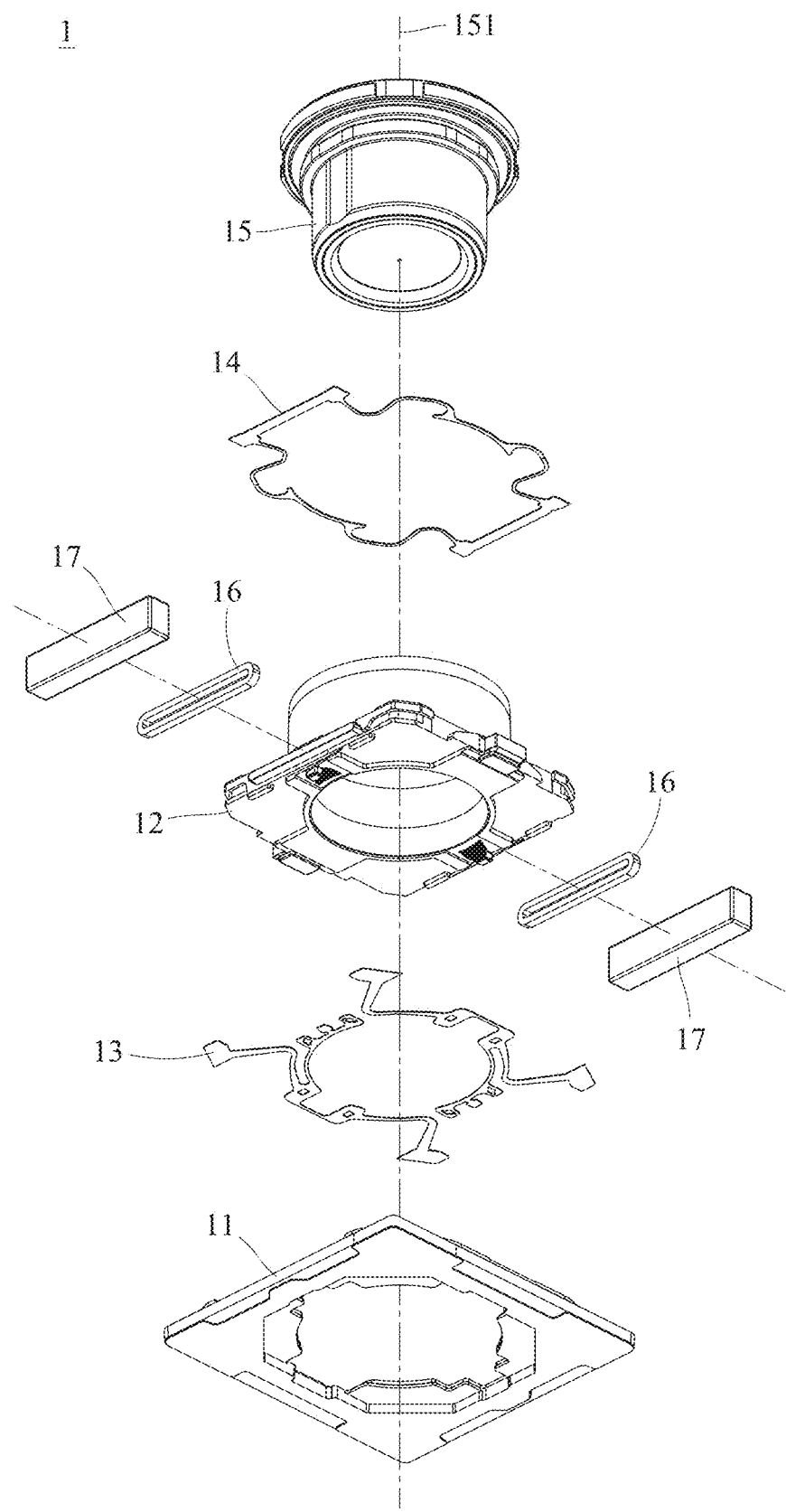
FIG. 1 is an exploded view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module that includes a fixed base, a carrier, an elastic element, an imaging lens, a coil, a magnetic element, a connection wire and an optical glue material.

The carrier is disposed opposite to the fixed base, and the carrier has a bobbin. Moreover, the bobbin and the remaining part of the carrier can be integrated into one piece. The elastic element is connected to the fixed base and the carrier so as to provide freedom of movement of the carrier along a direction with respect to the fixed base. The imaging lens is disposed on the carrier and has an optical axis. Moreover, the quantity of the bobbin can be two, and the two bobbins can be symmetrically disposed with respect to the optical axis of the imaging lens. Therefore, it is favorable for forming a mechanism design that can be used for the connection wire to be fixed thereon at both end of the imaging lens, thereby increasing assembly efficiency. Moreover, the carrier has freedom of movement along a direction in parallel with the optical axis with respect to the fixed base. Therefore, it is favorable for providing feasibility of auto-focusing of the camera module.

The coil is disposed on the carrier, and the magnetic element is disposed corresponding to the coil so as to provide a driving force for moving the carrier along the said direction. Moreover, the quantity of the coil can be two, and the two coils can be respectively disposed at two sides of the carrier. Therefore, it is favorable for maintaining the balance of the driving force while achieving a design of a micro driver.

The connection wire is disposed on the bobbin, and the connection wire is electrically connected to the elastic element and the coil. Moreover, the connection wire can be considered as a wire extending from the coil. Moreover, the bobbin can extend towards the fixed base, and the connection wire can be wound on the bobbin. With this configuration, it is favorable for automated production.

The optical glue material can be disposed on at least part of the connection wire. Specifically, the optical glue material can be a light-blocking coating. The connection wire can have at least part facing towards the optical axis, and the light-blocking coating can be disposed on the at least part of the connection wire facing towards the optical axis. Alternatively, the connection wire can have at least part fixedly disposed on the elastic element, and the light-blocking coating can be disposed on a position where the at least part of the connection wire and the elastic element are fixed. In this case, the at least part of the connection wire can be soldered to the elastic element, and the light-blocking coating can be disposed on a position where the connection wire and the elastic element are soldered.

The light-blocking coating, which can be used as a colloid for optical purpose, includes, but not limited to, a black material. Conventionally, the bobbin outwardly protruded from the carrier and the connection wire disposed thereon may together form a structure prone to reflect light, especially a protruded part of the connection wire extending towards the optical axis or a position where the connection wire and the elastic element are soldered. For this, the present disclosure provides the light-blocking coating to cover the place where light is easily reflected, thereby preventing light reflected off the connection wire on the bobbin from being incident on an image surface of the imaging lens. Further, the light-blocking coating can also fix the connection wire, such that the connection wire can be firmly secured. Moreover, the light-blocking coating can be a black glue material. Therefore, it is favorable for securing and protecting the connection wire with the good adhesion of the black glue material, thereby preventing the connection wire from being detached or broken and also providing good structural stability and an anti-reflection effect of the light-blocking coating. Moreover, the light-blocking coating can also be an insulation colloid, but the present disclosure is not limited thereto. Moreover, the light-blocking coating can be further disposed on at least part of the bobbin. Therefore, it is favorable for preventing the connection wire from being detached from the bobbin, and it is also favorable for increasing accuracy of the position where the light-blocking coating is coated. Moreover, the light-blocking coating can be located closer to the optical axis of the imaging lens than the bobbin. Therefore, it is favorable for easily intercepting high-intensity non-imaging light, thereby maintaining image quality of the imaging lens.

When a maximum field of view of the imaging lens is FOV, the following condition can be satisfied: $100 \text{ [deg.]} \leq \text{FOV} \leq 180 \text{ [deg.]}$. Therefore, it is favorable for applying the abovementioned driving structure to a wide-angle imaging lens so as to capturing an image with a large viewing angle. Moreover, the following condition can also be satisfied: $110 \text{ [deg.]} \leq \text{FOV} \leq 170 \text{ [deg.]}$. Therefore, it is favorable for obtaining a viewing angle range with a better light-blocking effect.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
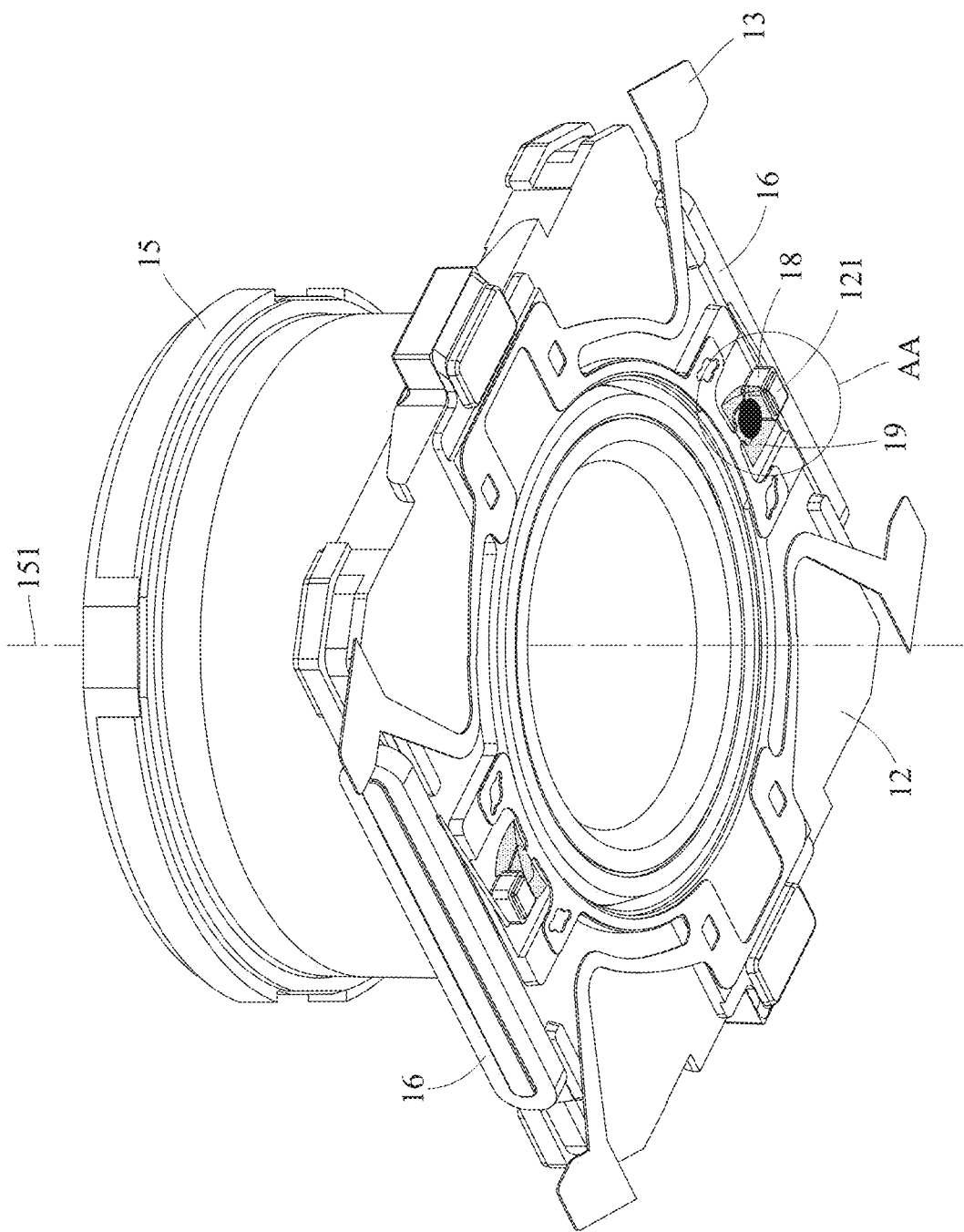
FIG. 2 is a perspective view of several components of the camera module in FIG. 1.
Figure 3:
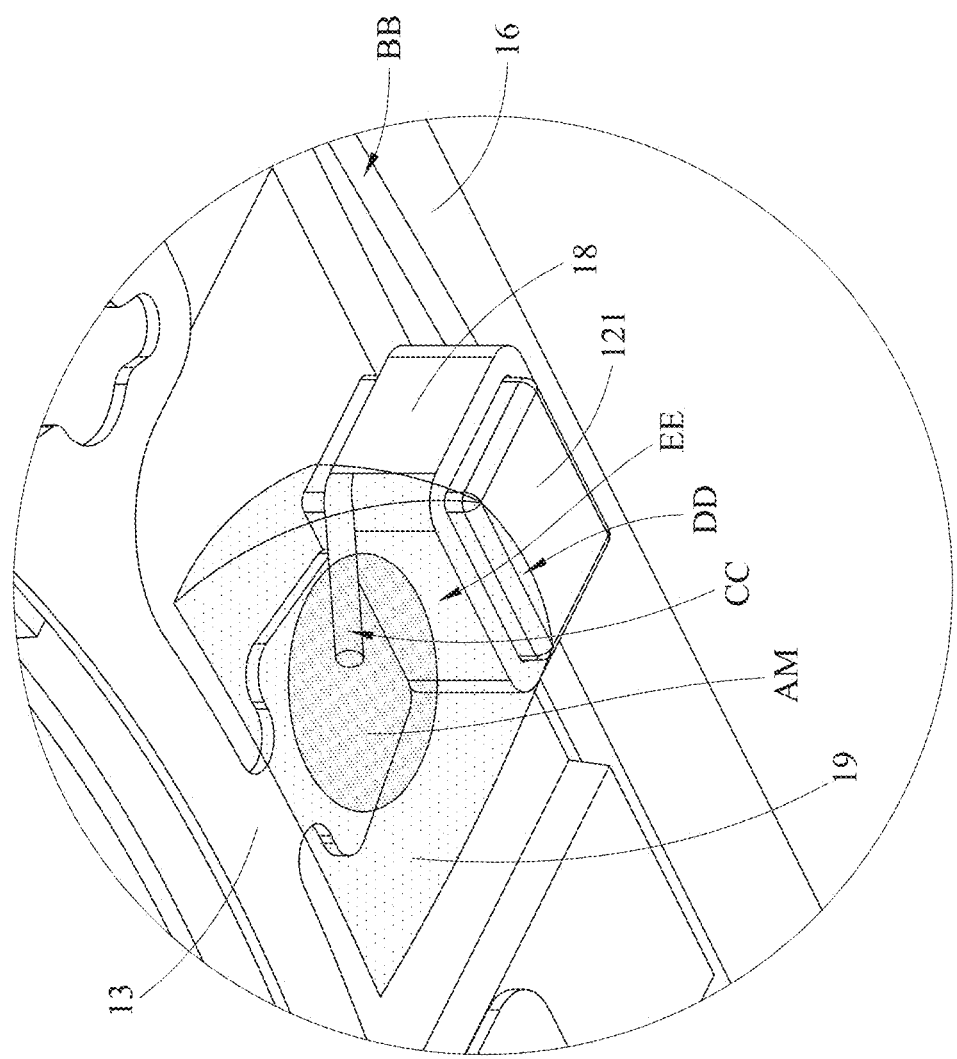
FIG. 3 is an enlarged view of AA region of the several components of the camera module in FIG. 2.

Please refer to FIG. 1 to FIG. 3, where FIG. 1 is an exploded view of a camera module according to the 1st embodiment of the present disclosure, FIG. 2 is a perspective view of several components of the camera module in FIG. 1, and FIG. 3 is an enlarged view of AA region of the several components of the camera module in FIG. 2.

In this embodiment, the camera module 1 includes a fixed base 11, a carrier 12, a first elastic element 13, a second elastic element 14, an imaging lens 15 having an optical axis 151, two coils 16, two magnetic elements 17, two connection wires 18 and two optical glue materials.

The carrier 12 is disposed opposite to the fixed base 11, and the carrier 12 has two bobbins 121. The bobbins 121 and the remaining part of the carrier 12 are integrated into one piece, and the bobbins 121 are symmetrically disposed with respect to the optical axis 151 of the imaging lens 15.

The first elastic element 13 is connected to the fixed base 11 and the carrier 12, and the imaging lens 15 is disposed on the carrier 12. The first elastic element 13 provides freedom of movement of the carrier 12 together with the imaging lens 15 disposed thereon along a direction in parallel with the optical axis 151 with respect to the fixed base 11. The second elastic element 14 is connected to the carrier 12 and the casing (not shown) of the camera module 1 so as to improve stability of movement of the carrier together with the imaging lens 15 disposed thereon along the direction in parallel with the optical axis 151.

The coils 16 are respectively disposed at two opposite sides of the carrier 12, and the magnetic elements 17 are disposed corresponding to the coils 16 so as to provide a driving force for moving the carrier 12 together with the imaging lens 15 disposed thereon along the direction in parallel with the optical axis 151.

The connection wires 18 are wound on the bobbins 121. The connection wires 18 are electrically connected to the first elastic element 13 and the coils 16. Specifically, each of the connection wires 18 is a wire extending from one coil 16, as shown by the extension part BB of the connection wire 18 in connection with the coil 16 in FIG. 3. Moreover, each of the connection wires 18 has at least part protruded towards the optical axis 151, as shown by the protrusion part CC of the connection wire 18 in FIG. 3, wherein the protrusion part CC is soldered to the first elastic element 13 through an adhesive material AM (e.g., solder). Moreover, each of the connection wires 18 further has at least part facing towards the optical axis 151, as shown by the lateral part EE of the connection wire 18 being close to the optical axis 151 in FIG. 3, wherein the adhesive material AM is also disposed on the lateral part EE of the connection wire 18.

The optical glue materials are light-blocking coatings 19, and each of the light-blocking coatings 19 is disposed on a part (as denoted by the protrusion part CC in FIG. 3) of one connection wire 18 extending towards the optical axis 151 and soldered to the first elastic element 13. Moreover, each of the light-blocking coatings 19 is further disposed on at least part of one bobbin 121, as shown by the partial bottom DD of the bobbin 121 in FIG. 3, wherein each of the light-blocking coatings 19 is located closer to the optical axis 151 of the imaging lens 15 than the corresponding bobbin 121.

When a maximum field of view of the imaging lens 15 is FOV, the following condition is satisfied: FOV=120 [deg.].

2nd Embodiment

Figure 4:
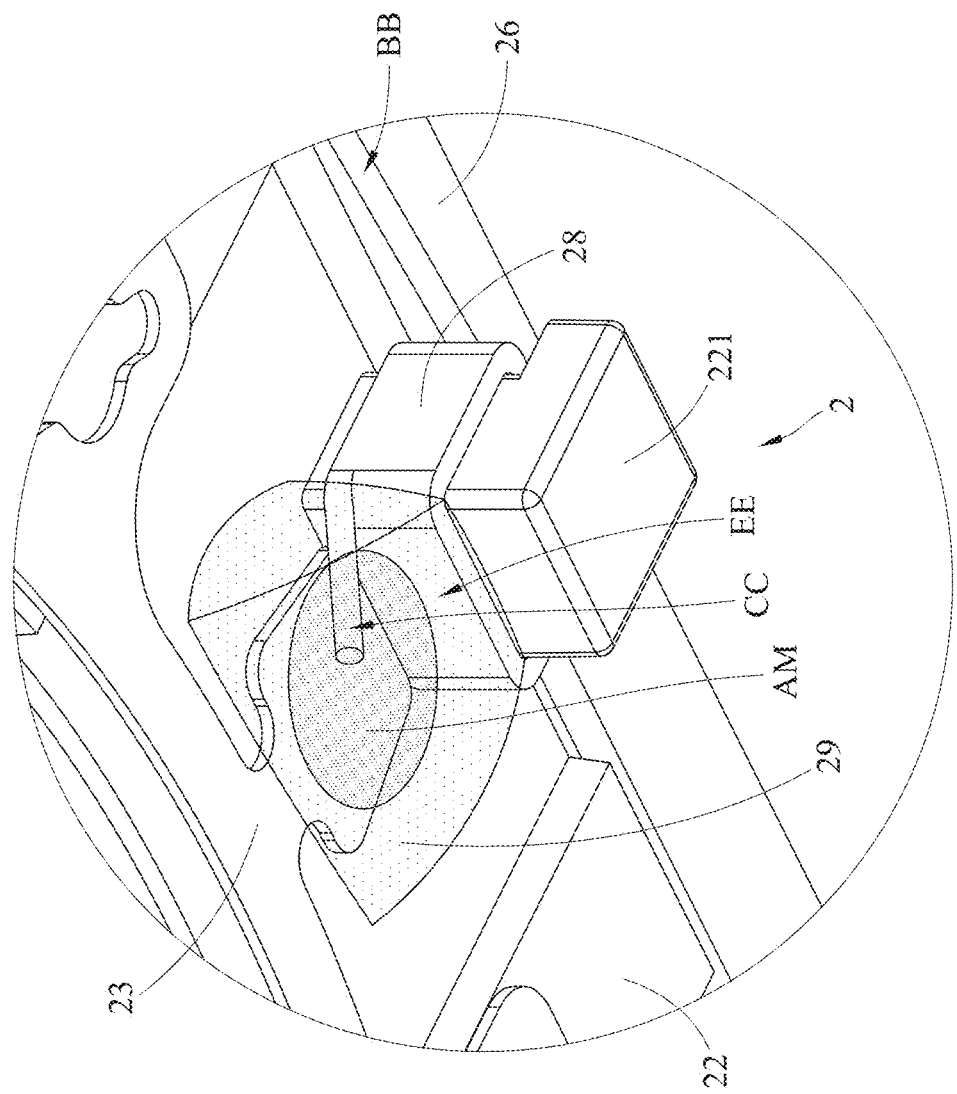
FIG. 4 is a partial and enlarged view of a camera module according to the 2nd embodiment of the present disclosure.

Please refer to FIG. 4, which is a partial and enlarged view of a camera module according to the 2nd embodiment of the present disclosure.

In this embodiment, the camera module 2 includes a fixed base (not shown), a carrier 22, a first elastic element 23, a second elastic element (not shown), an imaging lens (not shown) having an optical axis, at least one coil 26, at least one magnetic element (not shown), at least one connection wire 28 and at least one light-blocking coating 29. Note that this embodiment is similar to the 1st embodiment, and only difference between this and the 1st embodiments will be illustrated hereinafter. The carrier 22 has at least one bobbin 221, and the bobbins 221 extends towards the fixed base.

The first elastic element 23 provides freedom of movement of the carrier 22 together with the imaging lens disposed thereon along a direction in parallel with the optical axis with respect to the fixed base. The coil 26 is disposed corresponding to the magnetic element 27 so as to provide a driving force for moving the carrier 22 together with the imaging lens disposed thereon along the direction in parallel with the optical axis.

The connection wire 28 is wound on the bobbin 221. The connection wire 28 is a wire extending from the coil 26, as shown by the extension part BB of the connection wire 28 in connection with the coil 26 in FIG. 4. Moreover, the connection wire 28 has at least part protruded towards the optical axis, as shown by the protrusion part CC of the connection wire 28 in FIG. 4, wherein the protrusion part CC is soldered to the first elastic element 23 through an adhesive material AM (e.g., solder). Moreover, the connection wire 28 further has at least part facing towards the optical axis, as shown by the lateral part EE of the connection wire 28 being close to the optical axis in FIG. 4, wherein the adhesive material AM is also disposed on the lateral part EE of the connection wire 28.

The light-blocking coating 29 is disposed on a part (as denoted by the protrusion part CC in FIG. 4) of the connection wire 28 extending towards the optical axis and soldered to the first elastic element 23.

3rd Embodiment

Figure 5:
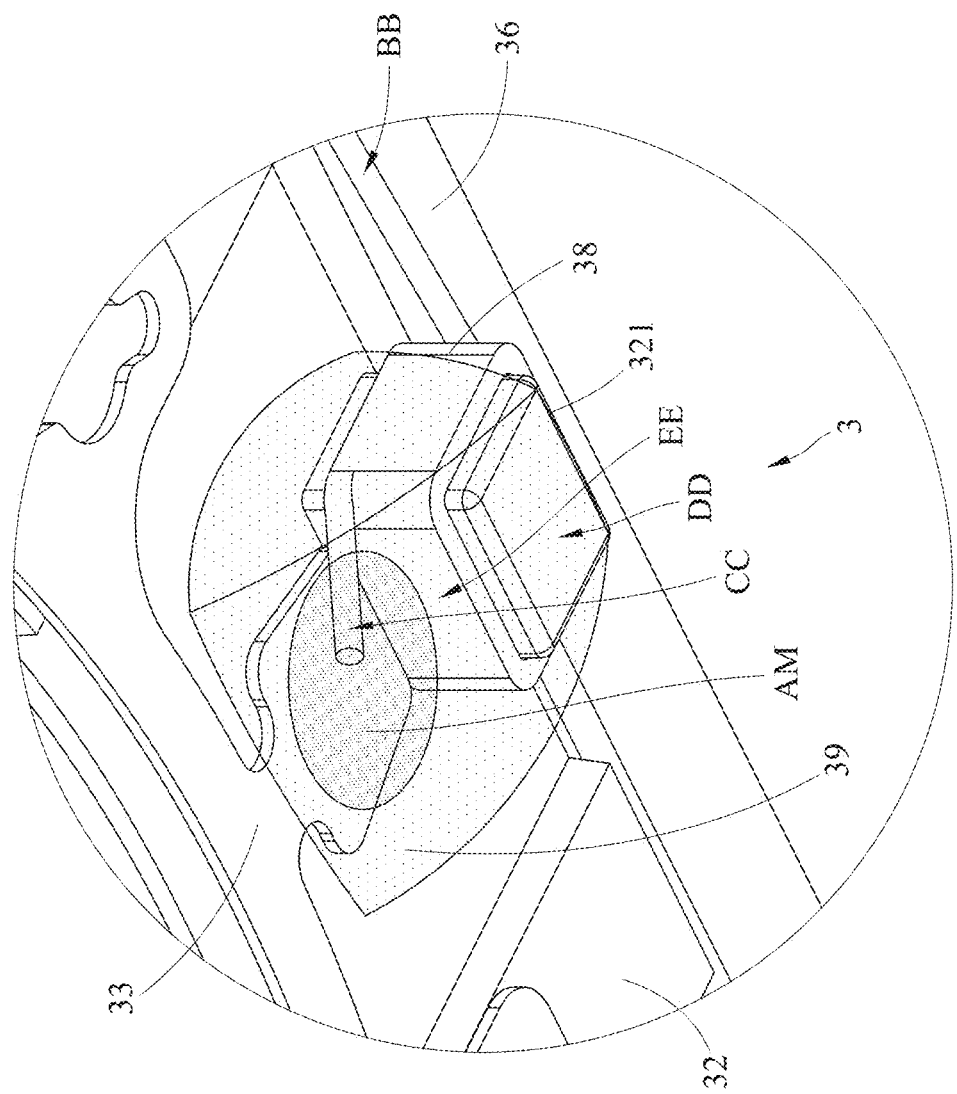
FIG. 5 is a partial and enlarged view of a camera module according to the 3rd embodiment of the present disclosure.

Please refer to FIG. 5, which is a partial and enlarged view of a camera module according to the 3rd embodiment of the present disclosure.

In this embodiment, the camera module 3 includes a fixed base (not shown), a carrier 32, a first elastic element 33, a second elastic element (not shown), an imaging lens (not shown) having an optical axis, at least one coil 36, at least one magnetic element (not shown), at least one connection wire 38 and at least one light-blocking coating 39. Note that this embodiment is similar to the 1st embodiment, and only difference between this and the 1st embodiments will be illustrated hereinafter.

The carrier 32 has at least one bobbin 321.

The first elastic element 33 provides freedom of movement of the carrier 32 together with the imaging lens disposed thereon along a direction in parallel with the optical axis with respect to the fixed base. The coil 36 is disposed corresponding to the magnetic element 37 so as to provide a driving force for moving the carrier 32 together with the imaging lens disposed thereon along the direction in parallel with the optical axis.

The connection wire 38 is wound on the bobbin 321. The connection wire 38 is a wire extending from the coil 36, as shown by the extension part BB of the connection wire 38 in connection with the coil 36 in FIG. 5. Moreover, the connection wire 38 has at least part protruded towards the optical axis, as shown by the protrusion part CC of the connection wire 38 in FIG. 5, wherein the protrusion part CC is soldered to the first elastic element 33 through an adhesive material AM (e.g., solder). Moreover, the connection wire 38 further has at least part facing towards the optical axis, as shown by the lateral part EE of the connection wire 38 being close to the optical axis in FIG. 5, wherein the adhesive material AM is also disposed on the lateral part EE of the connection wire 38.

The light-blocking coating 39 is disposed on a part (as denoted by the protrusion part CC in FIG. 5) of the connection wire 38 extending towards the optical axis and soldered to the first elastic element 33. Moreover, the light-blocking coating 39 is further disposed on at least part of the bobbin 321, as shown by the bottom DD of the bobbin 321 in FIG. 5.

4th Embodiment

Figure 6:
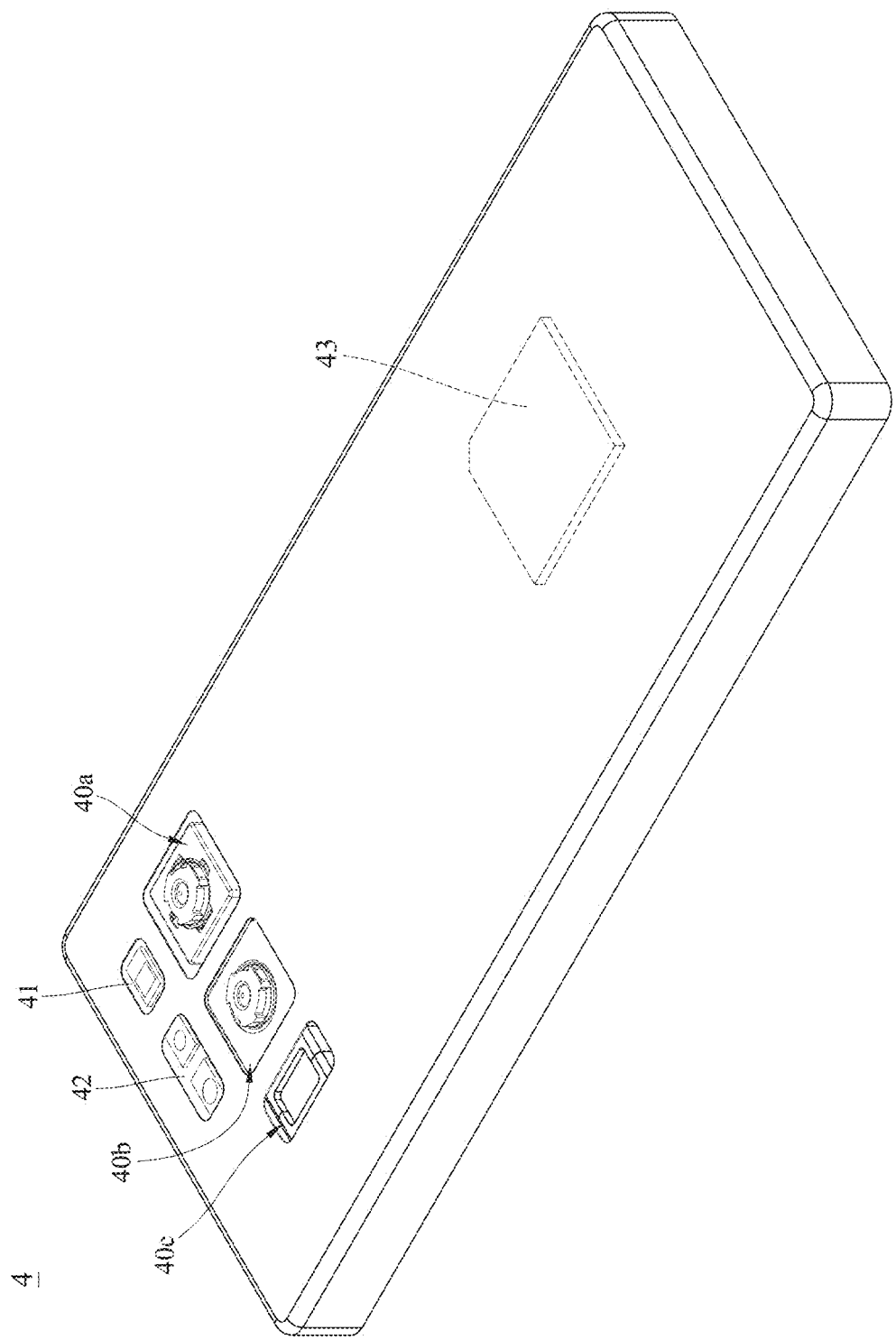
FIG. 6 is one perspective view of an electronic device according to the 4th embodiment of the present disclosure.
Figure 7:
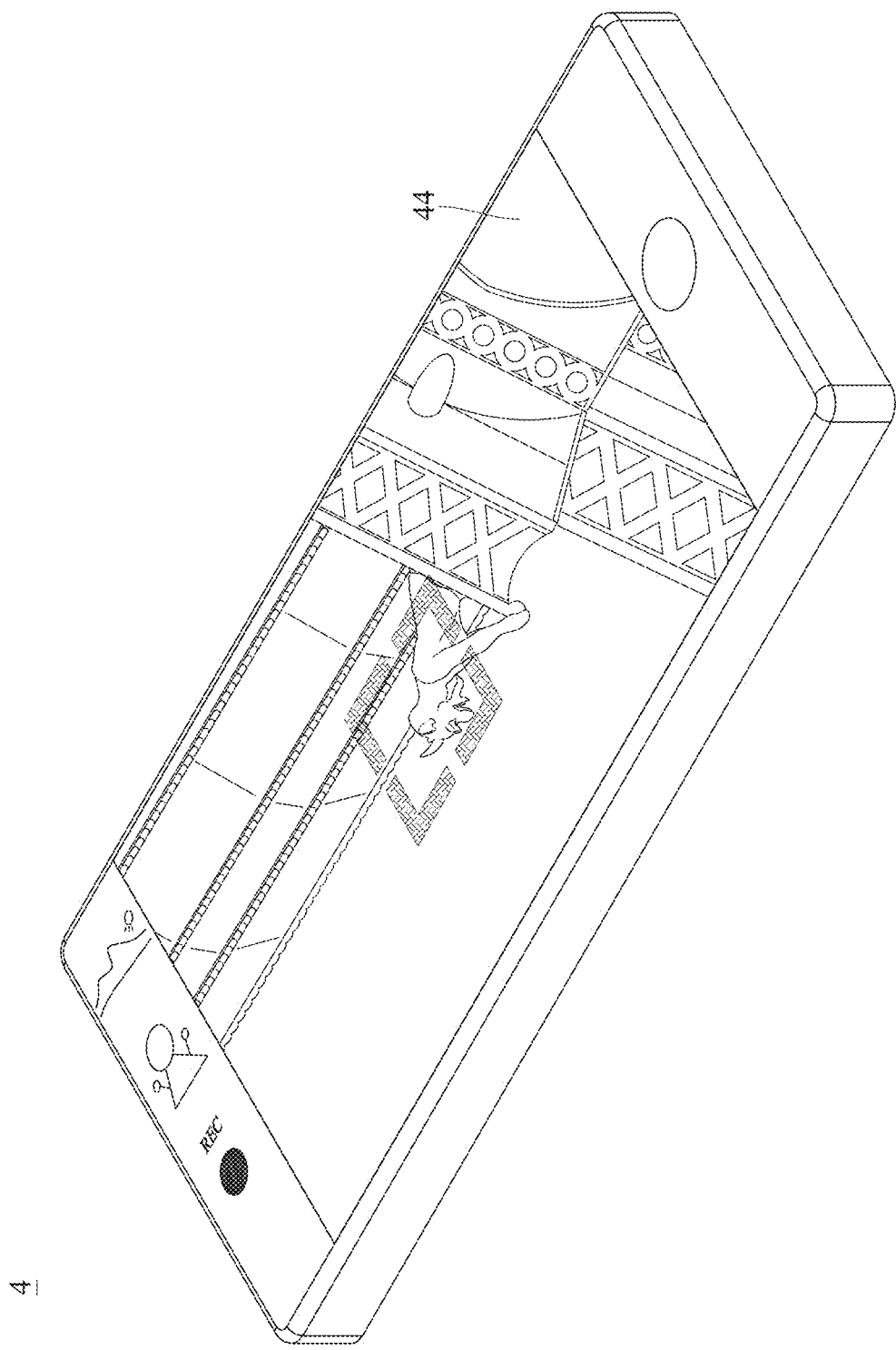
FIG. 7 is another perspective view of the electronic device in FIG. 6.

Please refer to FIG. 6 and FIG. 7, where FIG. 6 is one perspective view of an electronic device according to the 4th embodiment of the present disclosure, and FIG. 7 is another perspective view of the electronic device in FIG. 6.

In this embodiment, an electronic device 4 is a smartphone including a plurality of camera modules, a flash module 41, a focus assist module 42, an image signal processor 43, a display module (user interface) 44 and an image software processor (not shown).

The camera modules include an ultra-wide-angle camera module 40a, a high pixel camera module 40b and a telephoto camera module 40c. Moreover, the camera modules 40a includes one of the camera modules 1-3 of the present disclosure.

Figure 8:
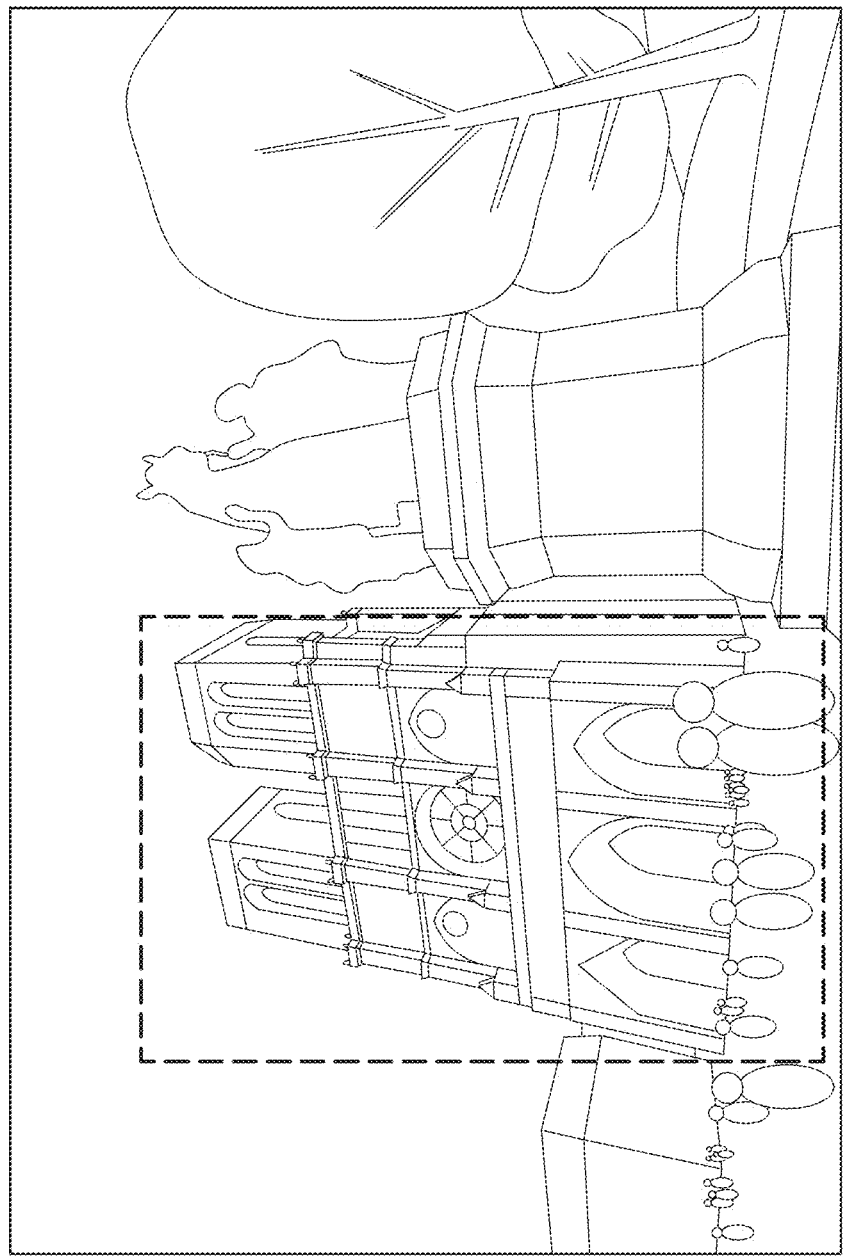
FIG. 8 is an image captured by the ultra-wide-angle camera module.

The image captured by the ultra-wide-angle camera module 40a enjoys a feature of multiple imaged objects. FIG. 8 is an image captured by the ultra-wide-angle camera module 40a. Moreover, the maximum field of view (FOV) of the camera modules 40a corresponds to the viewing angle in FIG. 8.

Figure 9:
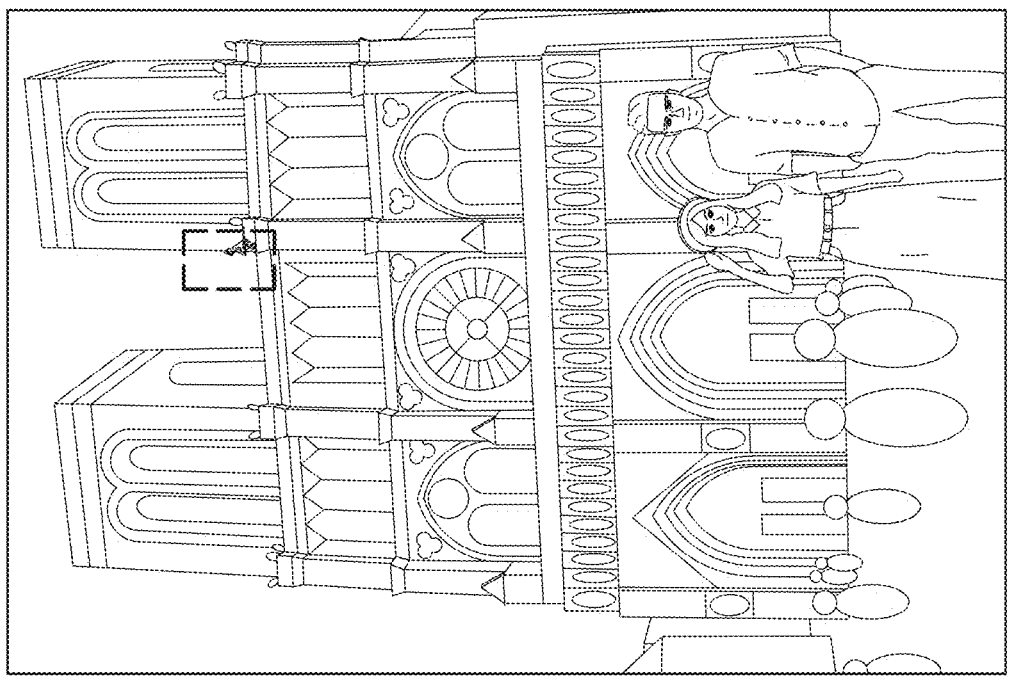
FIG. 9 is an image captured by the high pixel camera module.

The image captured by the high pixel camera module 40b enjoys a feature of high resolution and less distortion, and the high pixel camera module 40b can capture part of the image in FIG. 8. FIG. 9 is an image captured by the high pixel camera module 40b.

Figure 10:
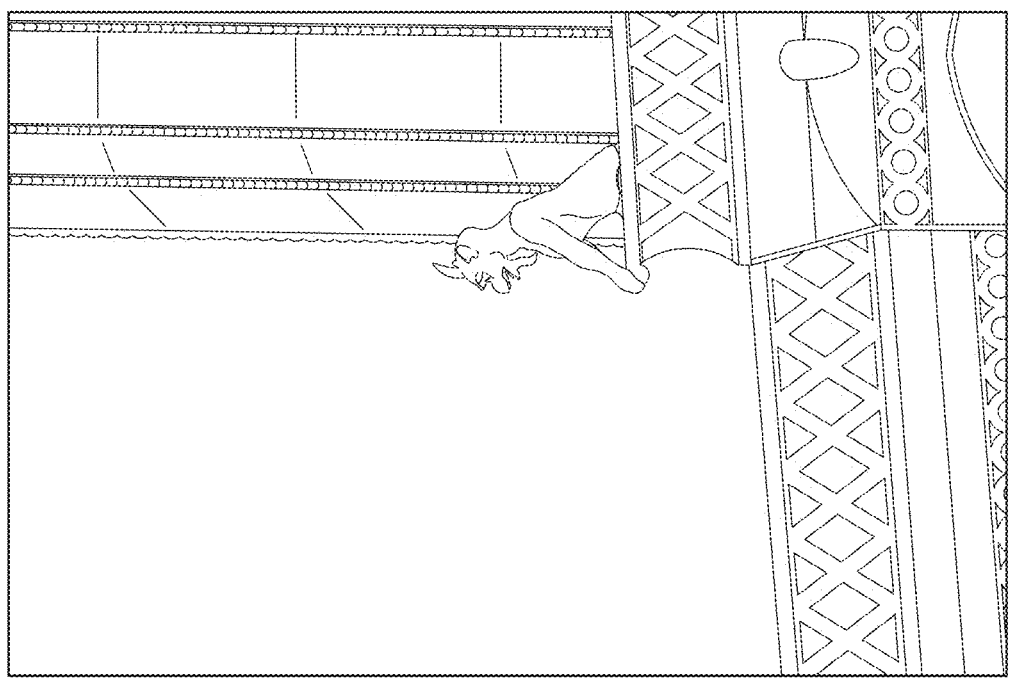
FIG. 10 is an image captured by the telephoto camera module.

The image captured by the telephoto camera module 40c enjoys a feature of high optical magnification, and the telephoto camera module 40c can capture part of the image in FIG. 9. FIG. 10 is an image captured by the telephoto camera module 40c.

When a user captures images of an object, the light rays converge in the ultra-wide-angle camera module 40a, the high pixel camera module 40b or the telephoto camera module 40c to generate images, and the flash module 41 is activated for light supplement. The focus assist module 42 detects the object distance of the imaged object to achieve fast auto focusing. The image signal processor 43 is configured to optimize the captured image to improve image quality and provided zooming function. The light beam emitted from the focus assist module 42 can be either conventional infrared or laser. The display module 44 can include a touch screen, and the user is able to interact with the display module 44 to adjust the angle of view and switch between different camera modules, and the image software processor having multiple functions to capture images and complete image processing. Alternatively, the user may capture images via a physical button. The image processed by the image software processor can be displayed on the display module 44.

5th Embodiment

Figure 11:
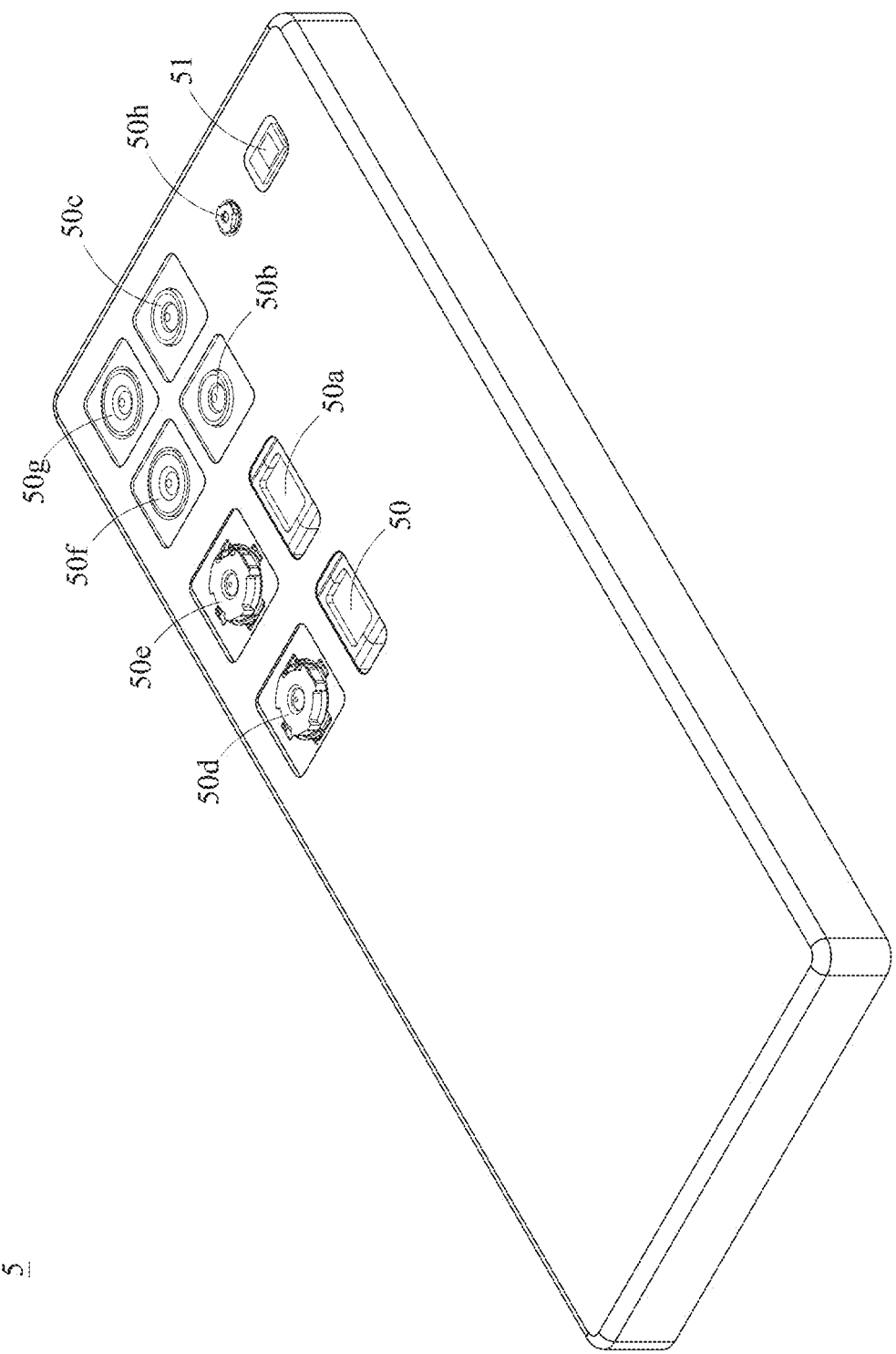
FIG. 11 is one perspective view of an electronic device according to the 5th embodiment of the present disclosure.

Please refer to FIG. 11, which is one perspective view of an electronic device according to the 5th embodiment of the present disclosure.

In this embodiment, an electronic device 5 is a smartphone including a camera module 50, a camera module 50a, a camera module 50b, a camera module 50c, a camera module 50d, a camera module 50e, a camera module 50f, a camera module 50g, a camera module 50h, a flash module 51, an image signal processor, a display module and an image software processor (not shown). The camera module 50, the camera module 50a, the camera module 50b, the camera module 50c, the camera module 50d, the camera module 50e, the camera module 50f, the camera module 50g and the camera module 50h are disposed on the same side of the electronic device 5, while the display module is disposed on the opposite side of the electronic device 5. At least one of the camera modules 50f and 50g includes one of the camera modules 1-3 of the present disclosure.

The camera module 50 is a telephoto camera module, the camera module 50a is a telephoto camera module, the camera module 50b is a telephoto camera module, the camera module 50c is a telephoto camera module, the camera module 50d is a wide-angle camera module, the camera module 50e is a wide-angle camera module, the camera module 50f is an ultra-wide-angle camera module, the camera module 50g is an ultra-wide-angle camera module, and the camera module 50h is a ToF (time of flight) camera module. In this embodiment, the camera module 50, the camera module 50a, the camera module 50b, the camera module 50c, the camera module 50d, the camera module 50e, the camera module 50f and the camera module 50g have different fields of view, such that the electronic device 5 can have various magnification ratios so as to meet the requirement of optical zoom functionality. In addition, the camera module 50 and the camera module 50a are telephoto camera modules having a light-folding element configuration. In addition, the camera module 50h can determine depth information of the imaged object. In this embodiment, the electronic device 5 includes a plurality of camera modules 50, 50a, 50b, 50c, 50d, 50e, 50f, 50g, and 50h, but the present disclosure is not limited to the number and arrangement of camera module. When a user captures images of an object, the light rays converge in the camera modules 50, 50a, 50b, 50c, 50d, 50e, 50f, 50g or 50h to generate an image(s), and the flash module 51 is activated for light supplement. Further, the subsequent processes are performed in a manner similar to the abovementioned embodiments, so the details in this regard will not be provided again.

6th Embodiment

Figure 12:
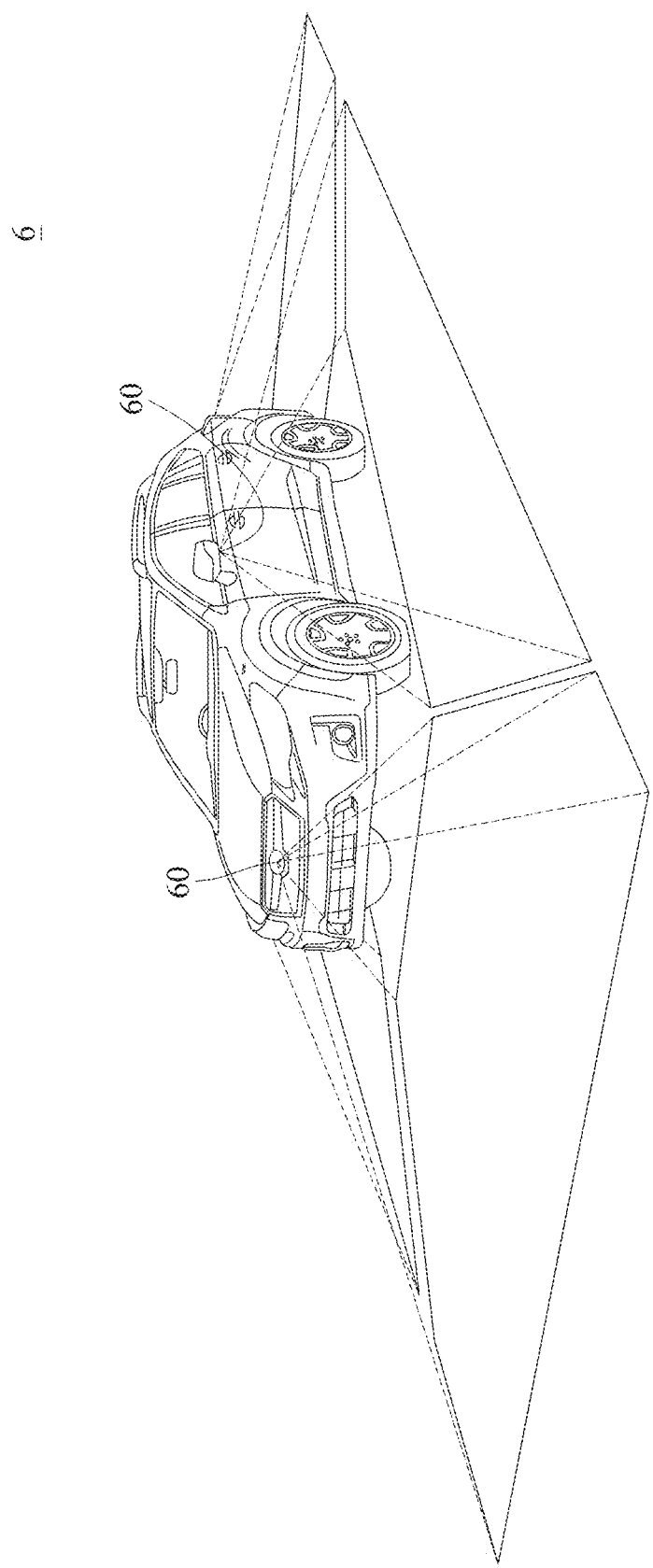
FIG. 12 is a perspective view of an electronic device according to the 6th embodiment of the present disclosure.
Figure 13:
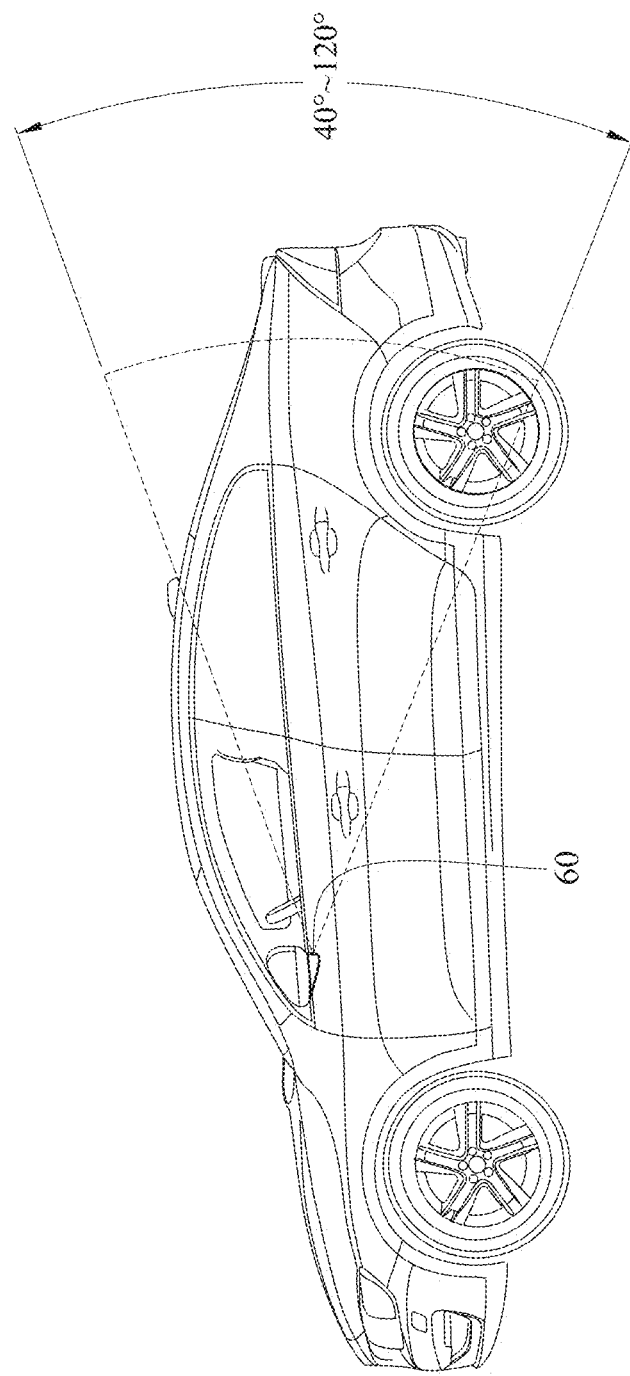
FIG. 13 is a side view of the electronic device in FIG. 12.
Figure 14:
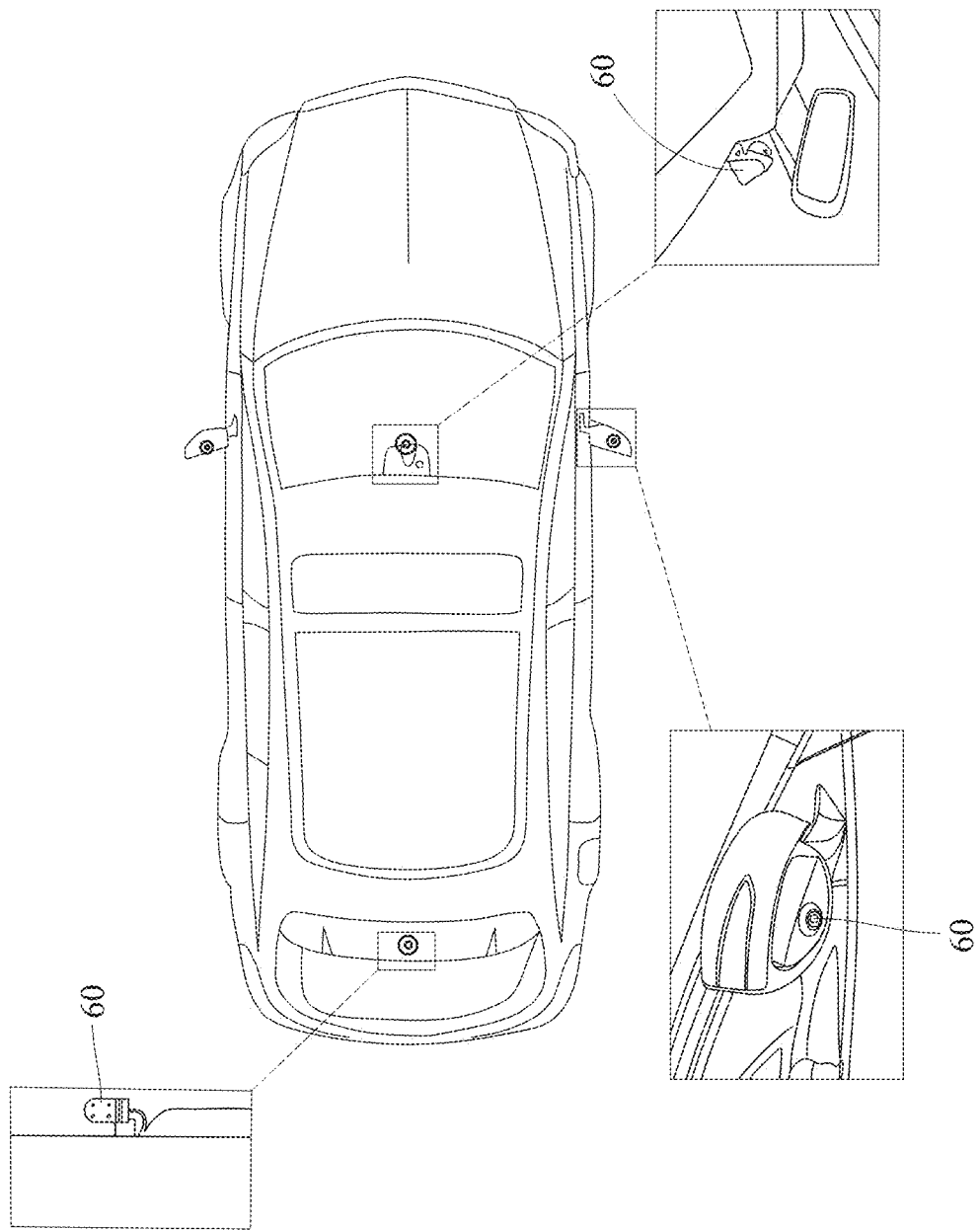
FIG. 14 is a top view of the electronic device in FIG. 12.

Please refer to FIG. 12 to FIG. 14, where FIG. 12 is a perspective view of an electronic device according to the 6th embodiment of the present disclosure, FIG. 13 is a side view of the electronic device in FIG. 12, and FIG. 14 is a top view of the electronic device in FIG. 12.

In this embodiment, an electronic device 6 is an automobile. The electronic device 6 includes a plurality of automotive camera modules 60, and the camera modules 60, for example, each include one of the camera modules 1-3 of the present disclosure. The camera modules 60 can be served as, for example, panoramic view car cameras, dashboard cameras and vehicle backup cameras.

As shown in FIG. 12, the camera modules 60 are disposed, for example, around the automobile to capture peripheral images of the automobile, which is favorable for recognizing road conditions outside the automobile so as to achieve an automatic driving assistant. In addition, the image software processor may stitch the peripheral images into a panorama image for the driver's checking every corner surrounding the automobile, thereby favorable for parking and driving.

As shown in FIG. 13, the camera modules 60 are disposed, for example, on the lower portions of the side mirrors. A maximum field of view of each of the camera modules 60 can range from 40 degrees to 120 degrees for capturing images on left and right sides within nearby lane regions.

As shown in FIG. 14, the camera modules 60 are disposed, for example, on the lower portions of the side mirrors and further at the inner sides of the front and rear windshields for providing external information to the driver, and also providing more viewing angles so as to reduce blind spots, thereby improving driving safety.

The smartphones or the automobile in the embodiments are only exemplary for showing the camera modules 1-3 of the present disclosure installed in an electronic device 4, 5 or 6, and the present disclosure is not limited thereto. The camera modules 1-3 can be optionally applied to optical systems with a movable focus. Furthermore, the camera modules 1-3 feature good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices, other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
a fixed base;
an imaging lens, having an optical axis;
a carrier, disposed opposite to the fixed base and the imaging lens disposed on the carrier, wherein the carrier has a bobbin, and the bobbin has at least part facing towards the optical axis;
an elastic element, connected to the fixed base and the carrier so as to provide freedom of movement of the carrier along a direction with respect to the fixed base;
a coil, disposed on the carrier;
a magnetic element, disposed corresponding to the coil so as to provide a driving force for moving the carrier along the direction;
a connection wire, disposed on the bobbin, wherein the connection wire is electrically connected to the elastic element and the coil; and
a light-blocking coating, disposed on the at least part of the bobbin facing towards the optical axis.

2. The camera module according to claim 1, wherein a quantity of the coil is two, and the two coils are respectively disposed at two sides of the carrier.

3. The camera module according to claim 1, wherein a quantity of the bobbin is two, and the two bobbins are symmetrically disposed with respect to the optical axis of the imaging lens.

4. The camera module according to claim 1, wherein the connection wire has at least part fixedly disposed on the elastic element, and the light-blocking coating is disposed on a position where the at least part of the connection wire and the elastic element are fixed.

5. The camera module according to claim 1, wherein a maximum field of view of the imaging lens is FOV, and the following condition is satisfied:

$$100\ [\text{deg.}] \leq FOV \leq 180\ [\text{deg.}].$$

6. The camera module according to claim 5, wherein the maximum field of view of the imaging lens is FOV, and the following condition is satisfied:

$$110\ [\text{deg.}] \leq FOV \leq 170\ [\text{deg.}].$$

7. The camera module according to claim 1, wherein the bobbin extends towards the fixed base, and the connection wire is wound on the bobbin.

8. The camera module according to claim 1, wherein the light-blocking coating is located closer to the optical axis of the imaging lens than the bobbin.

9. The camera module according to claim 1, wherein the light-blocking coating is a black glue material.

10. A camera module, comprising:
a fixed base;
a carrier, disposed opposite to the fixed base, wherein the carrier has a bobbin, and the bobbin has at least part facing towards the fixed base;
an elastic element, connected to the fixed base and the carrier so as to provide freedom of movement of the carrier along a direction with respect to the fixed base;
an imaging lens, disposed on the carrier and having an optical axis;
a coil, disposed on the carrier;
a magnetic element, disposed corresponding to the coil so as to provide a driving force for moving the carrier along the direction;
a connection wire, disposed on the bobbin, wherein the connection wire is electrically connected to the elastic element and the coil; and
a light-blocking coating, disposed on the at least part of the bobbin facing towards the fixed base.

11. The camera module according to claim 10, wherein a quantity of the coil is two, and the two coils are respectively disposed at two sides of the carrier.

12. The camera module according to claim 10, wherein a quantity of the bobbin is two, and the two bobbins are symmetrically disposed with respect to the optical axis of the imaging lens.

13. The camera module according to claim 10, wherein a maximum field of view of the imaging lens is FOV, and the following condition is satisfied:

$$100\ [\text{deg.}] \leq FOV \leq 180\ [\text{deg.}].$$

14. The camera module according to claim 13, wherein the maximum field of view of the imaging lens is FOV, and the following condition is satisfied:

$$110\ [\text{deg.}] \leq FOV \leq 170\ [\text{deg.}].$$

15. The camera module according to claim 10, wherein the light-blocking coating is located closer to the optical axis of the imaging lens than the bobbin.

16. The camera module according to claim 10, wherein the bobbin extends towards the fixed base, and the connection wire is wound on the bobbin.

17. An electronic device, comprising:
the camera module of claim 10.

* * * * *